US009761249B2

(12) United States Patent
Deleeuw (10) Patent No.: US 9,761,249 B2
(45) Date of Patent: Sep. 12, 2017

(54) IMPROVING NATURAL LANGUAGE INTERACTIONS USING EMOTIONAL MODULATION (71) Applicant: Intel Corporation, Santa Clara, CA (US)

(72) Inventor: William C. Deleeuw, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,659

(22) PCT Filed: Sep. 25, 2013

(86) PCT No.: PCT/US2013/061678
§ 371 (c)(1),
(2) Date: Dec. 27, 2013

(87) PCT Pub. No.: WO2015/047248
PCT Pub. Date: Apr. 2, 2015

(65) Prior Publication Data
US 2016/0210985 A1   Jul. 21, 2016

(51) Int. Cl.
*G10L 11/04* (2006.01)
*G10L 25/63* (2013.01)
(Continued)

(52) U.S. Cl.
CPC .............. *G10L 25/63* (2013.01); *G06F 17/28* (2013.01); *G10L 15/22* (2013.01); *G10L 2015/225* (2013.01)

(58) Field of Classification Search
CPC ............................................... G06F 2203/011
(Continued)

(56) References Cited

U.S. PATENT DOCUMENTS 6,275,806 B1 * 8/2001 Pertrushin ............... G10L 17/26
704/270
6,795,808 B1   9/2004 Strubbe et al.
(Continued)

FOREIGN PATENT DOCUMENTS

KR    10-2006-0099367 A    9/2006

OTHER PUBLICATIONS

International Search Report and Written Opinion for Application No. PCT/US2013/061666, dated Jul. 7, 2014, 11 pages.
(Continued)

*Primary Examiner* — Jakieda Jackson
(74) *Attorney, Agent, or Firm* — Barnes & Thornburg LLP (57) ABSTRACT

Technologies for emotional modulation of natural language responses include a computing device that receives natural language requests from a user. The computing device identifies emotional features of the request and estimates an emotional state of the request by comparing the emotional features to a vocal pattern database. The computing device generates a natural language response and modulates the emotional content of the natural language response based on the emotional state of the request and the vocal pattern database. The computing device may modulate the natural language response to mimic the emotional state of the request, or to oppose the emotional state of the request. Possible emotional states include urgency, certainty, and dominance. Possible emotional features include acoustic, prosodic, and linguistic characteristics of the user request. The computing device may update the vocal pattern database based on the user request to adapt to the user. Other embodiments are described and claimed.

19 Claims, 4 Drawing Sheets

(51) Int. Cl.
  *G06F 17/28* (2006.01)
  *G10L 15/22* (2006.01)

(58) Field of Classification Search
  USPC .................................................. 704/207, 275
  See application file for complete search history.

(56) References Cited

U.S. PATENT DOCUMENTS

| | | | | |
|---|---|---|---|---|
| 7,089,504 | B1* | 8/2006 | Froloff | G06F 17/241 715/764 |
| 8,027,842 | B2 | 9/2011 | Creamer et al. | |
| 2003/0040911 | A1* | 2/2003 | Oudeyer | G10L 13/033 704/266 |
| 2006/0122834 | A1* | 6/2006 | Bennett | G10L 15/1822 704/256 |
| 2008/0269958 | A1 | 10/2008 | Filev et al. | |
| 2009/0094637 | A1 | 4/2009 | Lemmons | |
| 2010/0070996 | A1 | 3/2010 | Liao et al. | |
| 2011/0188836 | A1 | 8/2011 | Popkiewicz et al. | |
| 2011/0283190 | A1 | 11/2011 | Poltorak | |
| 2012/0072217 | A1 | 3/2012 | Bangalore et al. | |
| 2012/0158502 | A1 | 6/2012 | Chung et al. | |
| 2013/0103624 | A1* | 4/2013 | Thieberger | G06N 99/005 706/12 |

OTHER PUBLICATIONS

Ayadi et al., "Survey on speech emotion recognition: Features, classification schemes, and databases," 44 Pattern Recognition, 2011, pp. 572-587.

Schroeder, "Expressive Speech Synthesis: Past, Present, and Possible Futures," 2011, 15 pages.

Zou et al., "Detecting Practical Speech Emotion in a Cognitive Task," Proceedings of 20th International Conference on Computer Communications and Networks (ICCCN), 2011, 5 pages.

Keysers et al., "Somatosensation in social perception," Nature Reviews, Neuroscience, vol. 11, Jun. 2010, pp. 417-428.

Iacoboni, "Imitation, Empathy, and Mirror Neurons," Annual Review of Psychology, vol. 60, Jan. 2009, pp. 653-670.

Wollermann et al.,"Modeling and Perceiving of (Un)Certainty in Articulatory Speech Synthesis," 6th ISCA Workshop on Speech Synthesis, Aug. 22-24, 2007, pp. 40-45.

Van Baaren et al., "Mimicry and Prosocial Behavior," Psychological Science, vol. 15, No. 1, Jan. 2004, pp. 71-74.

Weedon et al., "Perceived Urgency in Speech Warnings," Proceedings of the Human Factors and Ergonomics Society Annual Meeting, vol. 44, No. 2, Jul. 2000, pp. 690-693.

Wikipedia.org, "Mirror neuron," Wikipedia, The Free Encyclopedia, retrieved from: <http://en.wikipedia.org/w/index.php?oldid=562445218>, edited Jul. 1, 2013, 10 pages.

Wikipedia.org, "Natural language processing," Wikipedia, The Free Encyclopedia, retrieved from: <http://en.wikipedia.org/w/index.php?title=Natural_language_processing&oldid=524544195>, edited Nov. 23, 2012, 8 pages.

Wikipedia.org, "Expressions of dominance," Wikipedia, The Free Encyclopedia, retrieved from: <http://en.wikipedia.org/w/index.php?title=Expressions_of_dominance&oldid=516537754>, edited Oct. 7, 2012, 6 pages.

International Search Report and Written Opinion received for International Application No. PCT/US2013/061678, mailed Jun. 24, 2014, 12 pages.

\* cited by examiner

| Emotion | Weights for identified features ||||||||
|---|---|---|---|---|---|---|---|---|
| | Pitch | Amplitude | Rate | Disfluency | Variability of Rate | Message Length | Tonality | Word Choice |
| Urgency | 0.8 | 0.5 | 0.8 | 0.0 | -0.6 | -0.3 | 0.0 | 1.0 |
| Certainty | 0.0 | 0.2 | 0.2 | -0.9 | -0.8 | -0.8 | -0.9 | 1.0 |
| Dominance | -0.7 | 0.8 | 0.4 | -0.5 | 0.0 | -0.4 | -0.4 | 0.2 |

IMPROVING NATURAL LANGUAGE INTERACTIONS USING EMOTIONAL MODULATION

CROSS REFERENCE TO RELATED APPLICATIONS

This application is a national stage entry under 35 USC §371(b) of International Application No. PCT/US2013/061678, which was filed Sep. 25, 2013.

BACKGROUND

Humans understand a large number of verbal and non-verbal cues that convey information during human communication. In particular, a number of cues can convey the emotional content of a statement to a human listener, such as the pitch, amplitude, and rate of speech. Cues can also convey social information among humans, including indicating the speaker's dominant or non-dominant status in a conversation. In many circumstances, humans tend to mimic the cues being communicated by others. For example, a human engaging in a conversation with another human may generate cues mimicking the emotional state conveyed by the other human in the conversation. As another example, a human may generate cues to reinforce the dominance status conveyed by the other person (e.g., generating cues of non-dominance in conversations in which the other human has conveyed dominance). Communicating those emotional and social cues may allow humans to increase clarity of communication and reduce potential conflict.

Increasing numbers of computer systems support spoken natural language interaction. For example, virtual personal assistants are popular artificial intelligence systems that perform tasks on a computing device in response to natural-language requests from a user. Such tasks typically include managing calendar items, contacts, and informational searches. Other typical natural language applications include automated telephone answering and help line systems as well as dictation systems. Typical systems supporting natural language interaction do not respond to emotional or social cues present in the user request.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
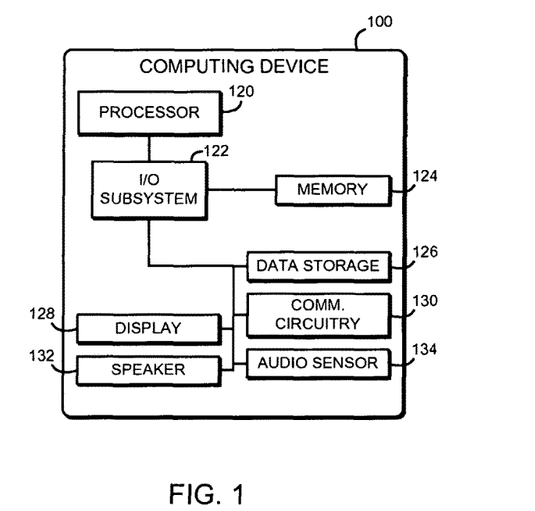
FIG. 1 is a simplified block diagram of at least one embodiment of a computing device for emotionally modulating natural language interactions.

Referring now to FIG. 1, an illustrative computing device 100 for emotionally modulating natural language interactions with a user is shown. In use, the user of the computing device 100 speaks a natural language user request to the computing device 100. The computing device 100 analyzes the user request to recognize any emotions exhibited in the user request. Recognized emotions may include the level of urgency, certainty, dominance, or other emotions expressed by the user. Based on the emotion of the user request, the computing device 100 modulates a natural language response to exhibit an appropriate emotion. The modulated emotion of the response may mimic the emotion of the user request, oppose the emotion of the user request, or convey additional information about the response. The computing device 100 may also seek clarification or otherwise modify the content of the natural language response based on the recognized emotion. By responding with appropriate emotional cues, the computing device 100 enables natural language interactions that more closely approximates human interaction. Better natural language interaction may increase the efficiency and enjoyment of the user, and may reduce frustration felt by the user. Accordingly, improved natural language interaction may increase the usefulness of virtual personal assistants.

The computing device 100 may be embodied as any type of device capable of performing the functions described herein. For example, the computing device 100 may be embodied as, without limitation, a smartphone, a cellular phone, a tablet computer, a notebook computer, a laptop computer, a desktop computer, a server computer, a distributed computing system, a multiprocessor system, a consumer electronic device, a smart appliance, and/or any other computing device capable of recognizing spoken user commands. As shown in FIG. 1, the illustrative computing device 100 includes a processor 120, an I/O subsystem 122, memory 124, and a data storage device 126. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store audio data corresponding to user requests, as well as databases containing information on identified features of those requests.

The computing device 100 further includes a display 128, communication circuitry 130, a speaker 132, and an audio sensor 134. The display 128 of the computing device 100 may be embodied as any type of display capable of displaying digital information such as a liquid crystal display (LCD), a light emitting diode (LED), a plasma display, a cathode ray tube (CRT), or other type of display device. In some embodiments, the display 128 may be coupled to a touch screen to receive user input.

The communication circuit 130 of the computing device 100 may be embodied as any communication circuit, device, or collection thereof, capable of enabling communications between the computing device 100 and/or other remote devices. The communication circuit 130 may be configured to use any one or more communication technology (e.g., wireless or wired communications) and associated protocols (e.g., Ethernet, Bluetooth®, Wi-Fi®, WiMAX, etc.) to effect such communication.

The speaker 132 may be embodied as any device capable of generating audio signals for output, such as a paper cone speaker, an audio transducer, a line out jack, a digital-to-analog converter (DAC), or other type of audio device. In some embodiments, the computing device 100 may transmit audio data or a higher-level representation of audio data for playback by a remote computing device, using the communication circuit 130. In those embodiments, the computing device 100 may not include the speaker 132.

The audio sensor 134 may be embodied as any sensor capable of capturing audio signals such as a microphone, a line input jack and associated circuitry, an analog-to-digital converter (ADC), or other type of audio sensor. The audio sensor 134 may be used by the computing device 100 to detect user requests uttered by the user, as described below. In some embodiments, the computing device 100 may receive audio data representing the user request from a remote computing device, using the communication circuit 130. In those embodiments, the computing device 100 may not include the audio sensor 134.

Further, although illustrated in FIG. 1 and described below as embodied as a single device, the computing device 100 may be embodied as a single computing device or a collection of servers and associated devices. For example, in some embodiments, the computing device 100 may be embodied as a "virtual server" formed from multiple computing devices distributed across a network and operating in a public or private cloud. Accordingly, it should be appreciated that the computing device 100 may be embodied as multiple devices cooperating together to facilitate the functionality described below.

Figure 2:
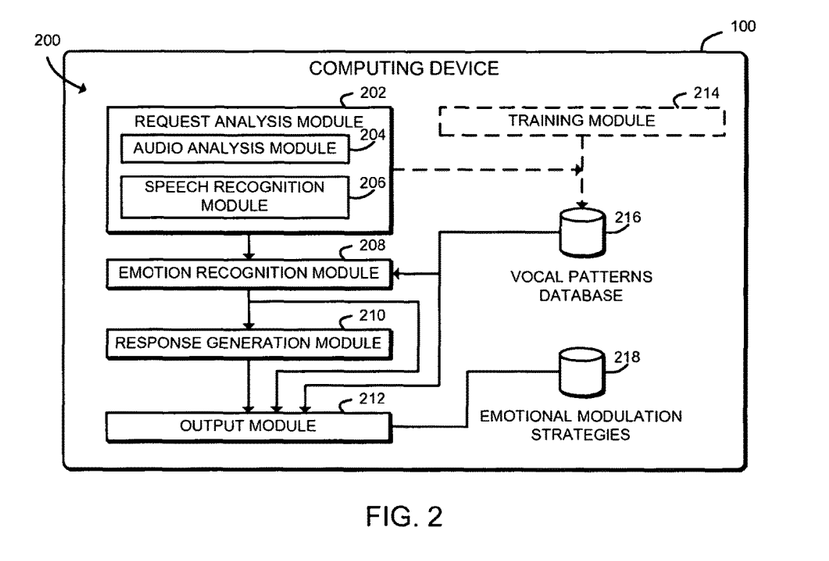
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative environment 200 includes a request analysis module 202, an emotion recognition module 208, a response generation module 210, and an output module 212. In some embodiments, the environment 200 may further include a training module 214. The various modules of the environment 200 may be embodied as hardware, firmware, software, or a combination thereof.

The request analysis module 202 is configured to receive user requests and identify emotional features of the user requests. Emotional features may include any feature of the user request that may be used by the computing device 100 to estimate an emotional state of the user associated with the user request. The emotional features may include audio features based on the audio signal of the user request (e.g., frequency, amplitude, timbre, etc.), as well as linguistic features based on the verbal content of the user request (e.g., articulation rate, message length, word choice, etc.). In some embodiments, those functions may be performed by sub-modules, for example by an audio analysis module 204 and/or a speech recognition module 206. Additionally or alternatively, in some embodiments the request analysis module 202 may update a vocal pattern database 216 based on the identified features, which may allow the computing device 100 to adapt to vocal patterns of the particular user.

The emotion recognition module 208 is configured to estimate one or more emotional states exhibited in the user request. To perform the estimation, the emotion recognition module 208 may compare the identified features of the user request with baseline features stored in the vocal pattern database 216. As described below, the emotion recognition module 208 may perform any suitable technique for identifying emotions based on the identified features.

The response generation module 210 is configured to generate a natural language response based on the user request. The response generation module 210 may be embodied as or interact with one or more user applications of the computing device 100. For example, the response generation module 210 may be embodied as a virtual personal assistant, and may be capable of generating natural language responses appropriate for that function. In addition to generating a natural language response based on the content of the user request and/or the result of application processing of that request, the response generation module 210 may generate a natural language request based on emotions identified in the user request. For example, the response generation module 210 may generate one or more clarifying questions based on detected uncertainty in the user request. As another example, the response generation module 210 may generate a request to defer processing the user request, based on a lack of urgency detected in the user request.

The output module 212 is configured to modulate the natural language response based on identified emotions of the user request. The output module 212 may select from a number of emotional modulation strategies 218 when determining how to modulate the natural language response. For example, the output module 212 may modulate the natural language response to mimic emotion detected in the user response or to oppose emotion detected in the response. The output module 212 may also convey information, such as estimated certainty, by modulating the natural language response. The output module 212 modulates the natural language response using the vocal pattern database 216, in order to exhibit emotions in a manner similar to the user.

In some embodiments, the training module 214 is configured to update the vocal pattern database 216 with features identified in a large number of sample requests. The sample requests may be generated by prompting the user to read a number of scripted responses both in a neutral manner and in an emotional manner. For example, the training module 214 may prompt the user to read a request in an "urgent" tone of voice. The sample requests may also be retrieved from a set of pre-recorded user requests that have been classified according to emotional content. In some embodiments, the training module 214 may be incorporated in the request analysis module 202.

As described above, the vocal pattern database 216 is configured to store features of user requests that have been identified by the computing device 100. The vocal pattern database 216 is used by the emotion recognition module 208 to identify and classify emotions in user requests, and by the output module 212 to modulate natural language responses. Although illustrated as resident in the computing device 100, in some embodiments part or all of the vocal pattern database 216 may be stored in an external database server or cloud service. In such embodiments, the vocal pattern database 216 may be shared among several computing devices.

Figure 3:
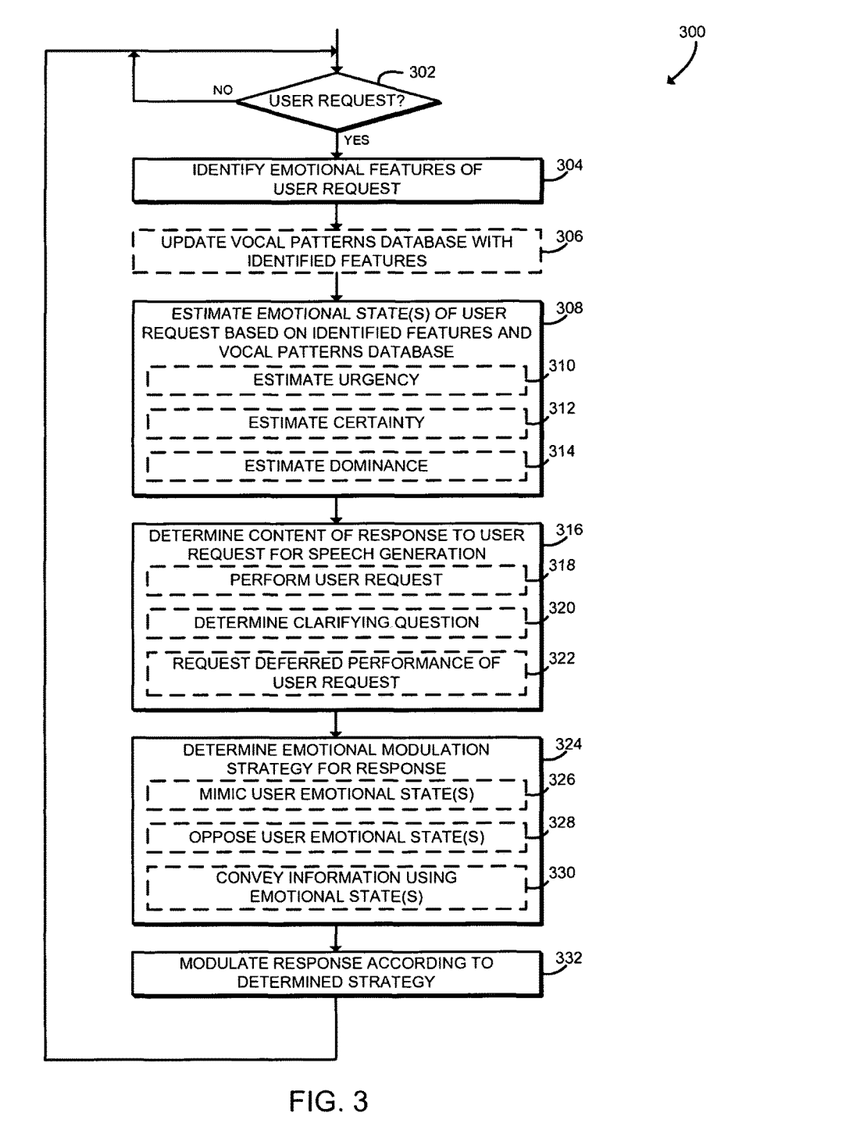
FIG. 3 is a simplified flow diagram of at least one embodiment of a method for handling spoken natural-language requests that may be executed by the computing device of FIGS. 1 and 2.

Referring now to FIG. 3, in use, the computing device 100 may execute a method 300 for handling spoken natural-language requests. The method 300 begins in block 302, in which the computing device 100 determines whether a user request has been received. The user request represents a natural language request spoken by the user of the computing device 100. The user request may be captured by the audio sensor 134 as when the user speaks a request directly to the computing device 100. Additionally or alternatively, the user request may be received by the computing device 100 from a remote computing device, as when a server receives a request from a mobile computing device. The user request may be stored as a digital audio file or in any other format useable for further analysis and manipulation as described below, including compressed and uncompressed formats. If no user request has been received, the method 300 loops back to block 302 to continue monitoring for user requests. If a user request has been received, the method 300 advances to block 304.

In block 304, the computing device 100 identifies and isolates the emotional features of the user request. The emotional features include any feature of the user request that may be used by the computing device 100 to estimate an emotional state of the user associated with the user request. Numerous examples of potential emotional features and automated emotion detection techniques are discussed by Moataz El Ayadi et al., *Survey on Speech Emotion Recognition: Features, Classification Schemes, and Databases,* 44 Pattern Recognition 572-587 (2011); Cairong Zou et al., *Detecting Practical Speech Emotion in a Cognitive Task,* 20 Proc. Intl Conf. on Computer Comm. & Networks (ICCCN) 1 (2011). For example, the features may include acoustic characteristics of the user request such as frequency, amplitude, timbre, signal power spectrum, or any other characteristic of the audio signal. As another example, the features may include prosodic characteristics of speech including articulation rate of speech, tonality, and the presence of disfluencies (e.g., pauses and filler words such as "um"), or the stressed syllables or phonemes within certain words. As yet another example, the features may include linguistic characteristics of speech including word choice. In some embodiments, word choice may be scored using a word/phrase-to-emotional scoring system. Of course, identifying linguistic features may require the computing device 100 to generate a textual representation of the user request by performing speech recognition. Identified features may also include statistical measures or other calculated features, such as average value, peak value, or variance.

Figure 4:
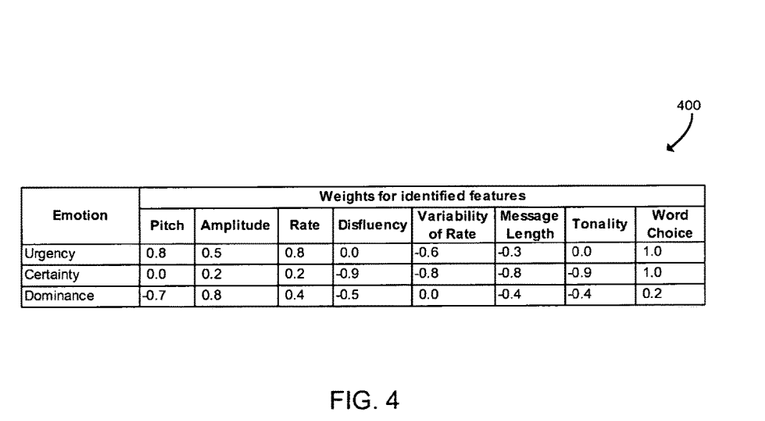
FIG. 4 is a table illustrating emotional features and weight factors that may be used for recognizing emotions.

Referring now to FIG. 4, a table 400 illustrates a sample set of features that may be identified in the user request. The illustrative features include pitch (i.e., fundamental frequency of user statement), amplitude, rate (i.e., rate of syllables or words), disfluency (e.g., presence or rate of disfluencies in user request), variability of rate, message length, tonality (e.g., raising of pitch at end of user request), and word choice. As described below, those features may be associated with one or more human emotions and therefore may be used to identify and classify emotions present in the user request. Of course, those features are only illustrative, and in other embodiments any number of appropriate features may be used.

Referring back to FIG. 3, after identifying the emotional features, in block 306 the computing device 100 may update the vocal pattern database 216 with the identified features in some embodiments. The computing device 100 may store the identified features in the vocal pattern database 216 and update associated statistical measures such as average and variance. Updating the vocal pattern database 216 allows the computing device 100 to learn and adapt to the particular emotional cues provided by the user. For example, by including identified features from numerous user requests by the same user, the average value of features in the vocal pattern database 216 may approach the typical baseline values of the particular user. Thus, emotional recognition by the computing device 100 may be improved through use.

In block 308, the computing device 100 estimates one or more emotional states of the user request based on the identified features and the vocal pattern database 216. To estimate the emotional state, the computing device 100 compares the identified features to baseline features stored in the vocal pattern database 216. The baseline features may be based on machine learning as described above, training data as described in connection with FIG. 5 below, or any combination of the two. The computing device 100 estimates particular emotions based on the relative differences between each feature and the baseline features, as well as the importance of a particular feature to the emotion. For example, in some embodiments, the computing device 100 may generate a feature vector describing all of the features identified in the user request. The computing device 100 may multiply each feature value by a weight factor included in a weight vector. The sum of the resulting products may be used as a score or index to rate whether a particular emotion is present in the user request. A different weight vector may be used for each recognizable emotion. Each weight vector may be generated by determining the factors that most accurately identify the particular emotion from a large set of sample requests such as training data or the vocal pattern database 216. Any appropriate mathematical technique may be used to generate the weight vector, such as a hidden Markov model, a Gaussian mixture model, or an artificial neural network. The computing device 100 may analyze the user request for any number of emotions, and more than one emotion may be present in a particular user request.

The computing device 100 may estimate any number and type of emotional states useful in estimating the emotional state of the user request. For example, in some embodiments in block 310, the computing device 100 estimates the level of urgency present in the user request. Urgency typically may be associated with increased pitch and increased rate of speech. Referring again to FIG. 4, the table 400 illustrates a sample weight vector for urgency. In the illustrative example, pitch and rate have both been assigned relatively high positive factors. Word choice, for example the presence of time-associated words and phrases such as "immediately" or "right now," may also be an important factor in determining urgency.

Referring back to FIG. 3, in block 312, in some embodiments the computing device 100 estimates the level of certainty present in the user request. The lack of certainty typically may be associated with an increased variability in the rate of speech, increased incidence of disfluencies such as filler words, and by a raised tonality at the end of a message (indicating a question). Referring again to FIG. 4, the table 400 illustrates a sample weight vector for certainty. In the illustrative example, disfluency, variability of rate, and tonality have been assigned relatively negative factors with relatively high absolute values, meaning the presence of those features indicates the lack of certainty. Word choice may also be an important factor in determining certainty, for example the presence of certain words like "yes" or "absolutely" and/or question words like "what" or "how."

Referring back to FIG. 3, in block 314, in some embodiments the computing device 100 estimates the level of dominance present in the user request. Dominance may be associated with lower-pitched speech spoken in a louder voice. Referring again to FIG. 4, the table 400 illustrates a sample weight vector for dominance. In the illustrative example, pitch has been assigned a negative factor with a relatively high absolute value, meaning that lower pitch tends to indicate the presence of dominance. On the other hand, amplitude has been assigned a relatively high positive factor, meaning that increased amplitude tends to indicate the presence of dominance. Of course, all of the weight factors shown in table 400 are for illustrative purposes only, and may not represent actual values used by the computing device 100.

Referring back to FIG. 3, in block 316, the computing device 100 determines the content of a natural language response to the user request. In some embodiments, the response may depend on the emotions identified in the user request, and in other embodiments, the response may be independent of any emotions identified in the user request. In addition to determining the content of the natural language response, the computing device 100 may perform one or more additional functions related to such determination. For example, in some embodiments, in block 318 the computing device 100 may perform an action associated with the user request. For example, in a virtual personal assistant system, the computing device 100 may update the user's calendar in response to the user request and generate a response indicating the status of the calendar update. In some embodiments, the computing device 100 may determine whether or not to perform the user request based on the identified emotions of the user request. For example, if the computing device 100 has identified a high level of urgency in the user request, the computing device 100 may determine to perform the user request immediately, without regard to the time or computing resources required to perform the user request. In some embodiments, the computing device 100 may determine that no natural language response is necessary. For example, if the computing device 100 has identified a high level of urgency, and the user request can be performed with high reliability, no natural language response may be necessary. Handling user requests without a natural language response may be similar to human behavior.

In some embodiments, in block 320 the computing device 100 may determine a clarifying question as part of the response to the user request. The computing device 100 may determine the clarifying question in response to identifying a decreased level of certainty in the user request. For example, in a virtual personal assistant system, the computing device 100 may generate a question requesting additional details for a new appointment when the user request was had a high level of uncertainty. As another example, the computing device 100 may determine the clarifying question by repeating and/or paraphrasing the user request as understood by the computing device 100 when the user request had a high level of uncertainty. In embodiments in which paraphrasing is used, the computing device 100 may use different words to convey the same meaning to verify the computing device 100 understood the meaning of the request. As an illustrative example, given a request to generate an appointment, the natural language response may include, "If I understood you correctly, you asked for me to make an appointment with Jan next Tuesday?" Such repetition may be similar to active listening performed by humans, and may allow the user to review or correct a user request that was made with some uncertainty.

In some embodiments, in block 322 the computing device 100 may request whether to defer performance of the user request. For example, the computing device 100 may generate a request whether to report back to the user in thirty minutes with the results of performing the user request. The computing device 100 may request deferral, for example, upon detection that the user request has a low level of urgency. Deferred performance of non-urgent user requests may approximate human behavior and therefore may increase efficiency or usability of the computing device 100 for the user. For example, the user may be able to "pipeline" tasks by speaking a request, instructing the computing device 100 to perform the request at a later time, and then moving on the next task.

After determining the content of the response, in block 324, the computing device 100 determines an emotional modulation strategy 218 for the response. The emotional modulation strategy 218 defines rules or procedures governing modification of the natural language response based on the identified emotions of the user request. The particular emotional modulation strategy 218 selected may depend on the emotions detected in the user request, as well as the outcome of any processing performed on the user request. In some embodiments, in block 326 the emotional modulation strategy 218 may be to mimic the emotional states identified in the user request. Mimicking emotions of the user request may improve communication and reduce frustration of the user. For example, when an increased level of urgency is detected in the user request, the computing device 100 may also increase the level of urgency in the response. The user may respond to the increased urgency in a positive manner, understanding that the computing device 100 has recognized the urgency of the situation and may be acting accordingly.

Any suitable type of emotional modulation strategies may be employed by the computing device 100. For example, in some embodiments, the emotional modulation strategy 218 may be to oppose the emotions recognized in the user request in block 328. Opposing recognized emotions may reassure the user and reduce user frustration. For example, upon detecting low certainty in the user request, the computing device 100 may increase certainty in the response to reassure the user that the user request has been performed. As another example, upon detecting a high level of dominance in the user request, the computing device 100 may decrease the level of dominance in the response. Reducing the level of dominance may reduce the human tendency of the user to compete for dominance and thus may reduce user frustration. Conversely, upon detecting a low level of dominance in the user request, the computing device 100 may increase the level of dominance in the response to signal to the user that the user request is being performed.

In some embodiments, in block 330 the emotional modulation strategy 218 may be to convey information to the user using the emotional state. That information may be based on the natural language response. For example, when the response has a high level of uncertainty—for example, when the user request was ambiguous—the computing device 100 may decrease the certainty level of the request. As another example, when the user request has a high level of urgency, and the computing device 100 has performed the user request, the computing device 100 may decrease the urgency level of the response to indicate that the task has been completed.

In block 332, the computing device 100 modulates the natural language response based on the determined emotional modulation strategy 218. The computing device 100 may adjust features of the natural language response based on the vocal pattern database 216. For example, the computing device 100 may adjust the pitch, amplitude, rate, or other characteristics of synthesized speech. As another example, the computing device 100 may construct the response from a set of sample audio clips associated with desired emotion. Additional information on various approaches for expressive speech synthesis are discussed in Marc Schröder, *Expressive Speech Synthesis: Past, Present, and Possible Futures*, in *Affective Information Processing* 111 (Jinhua Tao & Tieniu Tan eds., 2009). In some embodiments, the computing device 100 may modify the word choice of the natural language response, for example by using a dictionary associated with a particular emotion. The computing device 100 may output the modulated response directly using the speaker 132. In some embodiments, the computing device 100 may transmit the modulated response to a remote device, such as a mobile computing device (not shown). In some embodiments, when the computing device 100 has previously determined that no natural language response is necessary, the computing device 100 may suppress the natural language response altogether. After outputting the modulated response, the method 300 loops back to block 302 to monitor for additional user requests. Of course, as described above, those additional requests may be in response to a clarifying question or request to defer performance of the user request.

Figure 5:
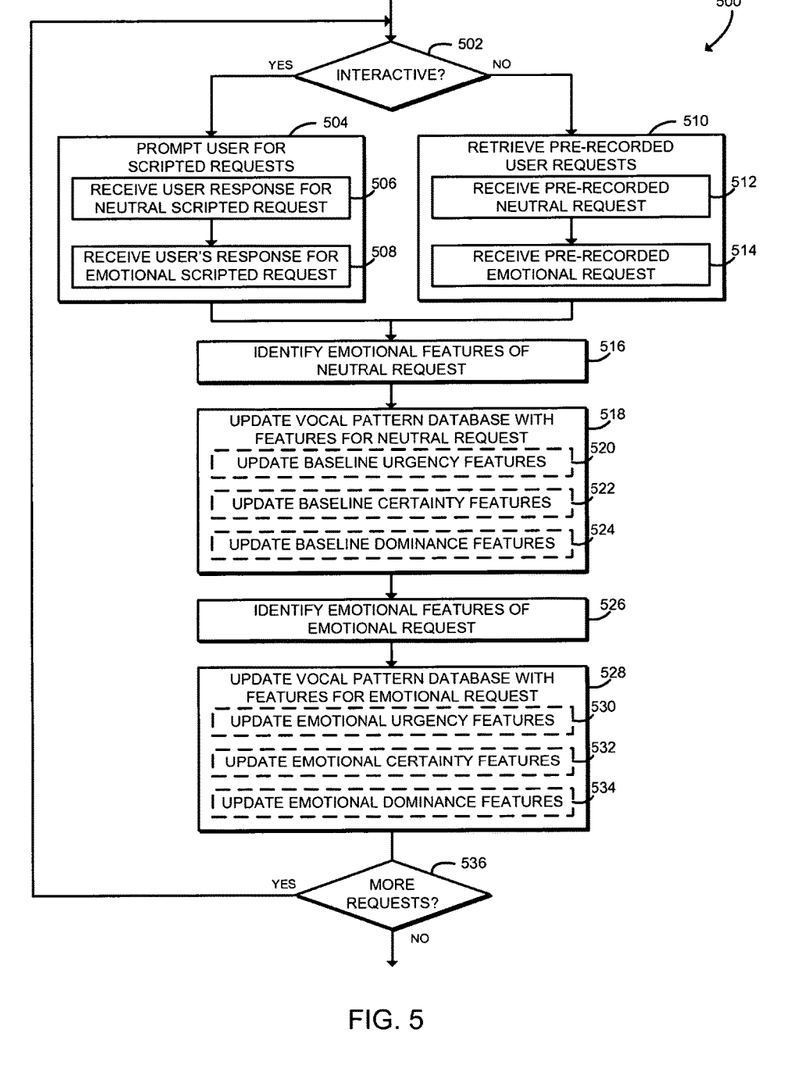
FIG. 5 is a simplified flow diagram of at least one embodiment of a method for training the computing device of FIGS. 1 and 2 for recognizing emotions in user requests.

Referring now to FIG. 5, in use, the computing device 100 may execute a method 500 for training to recognize emotions in user requests. The method 500 begins in block 502, in which the computing device 100 determines whether to perform interactive training. In some embodiments, interactive training may be performed based upon a user interface selection. In other embodiments, the computing device 100 may be pre-configured to perform interactive training or non-interactive training. If performing interactive training, the method 500 advances to block 504. If performing non-interactive training, the method 500 advances to block 510, described below.

In block 504, the computing device 100 prompts the user to recite a series of scripted requests. The scripted requests may be textually displayed to the user on the display 128, or prompted audibly using speech synthesis. The user may read the request aloud, and the user's response is recorded using the audio sensor 134. In block 506, the computing device 100 receives the user response for a neutral scripted request. The computing device 100 may instruct the user to read the scripted request using a neutral tone of voice, without displaying emotion. In some embodiments, the subject matter of the scripted request may also be typical, not noteworthy, uninteresting, or otherwise neutral in character. In block 508, the computing device 100 receives the user response for an emotional scripted request. For the emotional request, the computing device 100 may instruct the user to read the scripted request using a tone of voice appropriate for a particular emotion such as urgency, certainty, dominance, joy, alarm, fear, or any other emotion. The subject matter of the scripted request may be the same as a previous neutral scripted request. In other embodiments, the subject matter of the scripted request may be emotional in character. There need not be identical numbers of neutral and emotional scripted requests. Additionally or alternatively, the computing device 100 may prompt the user for more emotional scripted requests than neutral scripted requests. Thus, during interactive training, the computing device 100 relies on the user to be able to accurately portray emotions when responding to scripted requests. The scripted responses may be pre-graded for emotional content by a human, and the results analyzed for feature vector elements associated with those emotions. Additionally or alternatively, in some embodiments the user may describe emotional images, and the descriptions may be analyzed similarly to the scripted responses. Each image may be associated with multiple emotions, and the proportion of each emotion may be used to analyze the feature vector.

Referring back to block 502, if non-interactive training is to be performed, the method 500 advances to block 510. In block 510, the computing device 100 retrieves pre-recorded user requests. The pre-recorded user requests may have been recorded during previous interactive training sessions or during previous interactions with the computing device 100 or similar computing devices. The pre-recorded requests may have been created by other users during interactive training sessions, or may be crowd-sourced from multiple users. Additionally, the pre-recorded user requests may be selected from any pre-existing corpus of natural language requests. Each of the pre-recorded user requests has been categorized according to emotional content; that is, each pre-recorded user request has been identified as being neutral or as exhibiting various polarities of one or more emotions. For example, a pre-recorded request may be classified as relaxed, neutral, or urgent. The classification of the pre-recorded user requests may have been performed manually by one or more humans. In block 512, the computing device 100 receives a pre-recorded neutral request. In block 514, the computing device 100 receives a pre-recorded emotional request. As described above, there need not be identical numbers of neutral requests and emotional requests.

After receiving the sample user requests in block 504 or block 510, in block 516, the computing device 100 identifies and isolates the emotional features of the neutral request. Similar to as with the user request described above in connection with block 304 of FIG. 3, the emotional features include any feature of the sample request that may be used by the computing device 100 to estimate an emotional state associated with the sample request. As described above, the emotional features may include acoustic characteristics, prosodic characteristics of speech, linguistic characteristics, or other features measuring vocal pattern characteristics of the sample request.

In block 518, the computing device 100 updates the vocal pattern database 216 based on the identified emotional features of the neutral request. The computing device 100 may store the identified emotional features as a set of baseline features that will be used for future comparisons. The computing device 100 may store the identified emotional features in the vocal pattern database 216, allowing the average value of the emotional features to be updated accordingly. The computing device 100 may update baseline values for some or all of the emotional states recognized in the vocal pattern database 216. In some embodiments, in block 520, the computing device 100 may update the baseline features in the vocal pattern database 216 for urgency. In some embodiments, in block 522, the computing device 100 may update the baseline features in the vocal pattern database 216 for certainty. In some embodiments, in block 524, the computing device 100 may update the baseline features in the vocal pattern database 216 for dominance.

In block 526, the computing device 100 identifies and isolates the emotional features of the emotional request. As described above with respect to the neutral request, the emotional features include any feature of the sample request that may be used by the computing device 100 to estimate an emotional state associated with the sample request. As described above, the emotional features may include acoustic characteristics, prosodic characteristics of speech, linguistic characteristics, or other features measuring vocal pattern characteristics of the sample request.

In block 528, the computing device 100 updates the vocal pattern database 216 based on the identified emotional features of the emotional request. The computing device 100 may store the identified emotional features as a set of outlying features that may be used to identify particular emotions. As described above in connection with block 310 of FIG. 3, the computing device 100 may determine a set of weight factors that, when applied to the features of emotional requests stored in the vocal pattern database 216, most accurately identify the emotion associated with the sample request. The vocal pattern database 216 may be updated only for emotions present in the sample request; that is, the prompted emotion for scripted responses and the previously classified emotion for pre-recorded responses. In some embodiments, in block 530, the computing device 100 may update the emotional features in the vocal pattern database 216 for urgency. In some embodiments, in block 532, the computing device 100 may update the emotional features in the vocal pattern database 216 for certainty. In some embodiments, in block 534, the computing device 100 may update the emotional features in the vocal pattern database 216 for dominance.

In block 536, the computing device 100 determines whether additional sample requests remain for training. Training the computing device 100 may require processing many sample requests. In some embodiments, the computing device 100 may determine whether additional scripted requests remain for training. Additionally or alternatively, the computing device 100 may determine whether additional pre-recorded requests exist. If no additional sample requests remain, the method 500 is completed, and the computing device 100 is ready for use in handling spoken-language requests. If additional sample requests remain, the method 500 loops back to block 502. Additionally, although the method 500 is illustrated as iterating through each sample request sequentially, in some embodiments the sample requests may be processed in parallel or in any other order. For example, the computing device 100 may load an entire corpus of sample requests into the vocal pattern database 216, and then perform data analysis on the vocal pattern database 216 in parallel.

It should be understood that the method 500 for training need not be executed close in time to the method 300 for handling spoken language requests, or even on the same computing device 100. For example, a computing device 100 may be pre-configured with initial values based on the results of training with pre-recorded user requests. After the computing device 100 is shipped to the end user, interactive training may further tune the emotional recognition process.

EXAMPLES

Illustrative examples of the devices, systems, and methods disclosed herein are provided below. An embodiment of the devices, systems, and methods may include any one or more, and any combination of, the examples described below.

Example 1 includes a computing device for handling spoken requests, the computing device comprising a request analysis module to: receive a user request, the user request to represent a natural language request spoken by a user of the computing device; and identify an emotional feature of the user request, the emotional feature comprising a vocal pattern characteristic of the user request associated with one or more human emotions; an emotion recognition module to: compare the identified emotional feature to a baseline emotional feature of a vocal pattern database; and estimate an emotional state of the user request based on the comparison of the identified emotional feature to the baseline feature; and an output module to modulate a natural language response to the user request as a function of the emotional state and the vocal pattern database.

Example 2 includes the subject matter of Example 1, and wherein to identify the emotional feature comprises to identify a pitch, an amplitude, a rate of speech, a disfluency rate, a variability of the rate of speech, a tonality at an end of the user request, a stressed syllable, a stressed phoneme, or a message length.

Example 3 includes the subject matter of any of Examples 1 and 2, and wherein to identify the emotional feature comprises to: perform speech recognition to determine a textual representation of the user request; and identify and score a word choice of the user request based on the textual representation.

Example 4 includes the subject matter of any of Examples 1-3, and wherein the request analysis module is further to update the vocal pattern database based on the identified emotional feature.

Example 5 includes the subject matter of any of Examples 1-4, and wherein to estimate the emotional state comprises to estimate at least one of: an urgency level of the user request; a certainty level of the user request; or a dominance level of the user request.

Example 6 includes the subject matter of any of Examples 1-5, and wherein to modulate the natural language response comprises to modulate a pitch, an amplitude, a rate of speech, a disfluency rate, a variability of the rate of speech, a stress of a syllable, a stress of a phoneme, or a message length of the natural language response, or a tonality at an end of the natural language response.

Example 7 includes the subject matter of any of Examples 1-6, and wherein to modulate the natural language response comprises to modify a word choice of the natural language response as a function of the emotional state and the vocal pattern database.

Example 8 includes the subject matter of any of Examples 1-7, and wherein to modulate the natural language response comprises to modulate the natural language response to mimic the emotional state of the user request as a function of the emotional state and the vocal pattern database.

Example 9 includes the subject matter of any of Examples 1-8, and wherein the estimated emotional state comprises an estimated urgency level of the user request, wherein the estimated urgency level has a predetermined relationship to a baseline urgency level; and to modulate the response comprises to modulate the natural language response to mimic the estimated urgency level of the user request.

Example 10 includes the subject matter of any of Examples 1-9, and wherein to modulate the natural language response comprises to modulate the natural language response to exhibit an emotional state opposite the estimated emotional state of the user request.

Example 11 includes the subject matter of any of Examples 1-10, and wherein the estimated emotional state comprises an estimated dominance level of the user request, wherein the estimated dominance level has a predetermined relationship to a baseline dominance level; and to modulate the response comprises to modulate the natural language response to exhibit a dominance level opposite the estimated dominance level of the user request.

Example 12 includes the subject matter of any of Examples 1-11, and wherein to modulate the natural language response comprises to modulate the natural language response to convey information using a simulated emotional state.

Example 13 includes the subject matter of any of Examples 1-12, and wherein to modulate the natural language response to convey the information comprises to modulate the natural language response to convey an uncertainty level of the natural language response using the simulated emotional state.

Example 14 includes the subject matter of any of Examples 1-13, and further including a response generation module to determine the natural language response as a function of the emotional state of the user request.

Example 15 includes the subject matter of any of Examples 1-14, and wherein the estimated emotional state comprises an estimated certainty level of the user request, wherein the estimated certainty level has a predetermined relationship to a baseline certainty level; and to determine the natural language response comprises to generate a clarifying question.

Example 16 includes the subject matter of any of Examples 1-15, and wherein the estimated emotional state comprises an estimated certainty level of the user request, wherein the estimated certainty level has a predetermined relationship to a baseline certainty level; and to determine the natural language response comprises to paraphrase the user request.

Example 17 includes the subject matter of any of Examples 1-16, and wherein the estimated emotional state comprises an estimated urgency level of the user request, wherein the estimated urgency level has a predetermined relationship to a baseline urgency level; and to determine the natural language response comprises to generate a request whether to defer performance of the user request.

Example 18 includes the subject matter of any of Examples 1-17, and wherein to determine the natural language response comprises to determine no natural language response is necessary; and to modulate the natural language response comprises to suppress the natural language response.

Example 19 includes the subject matter of any of Examples 1-18, and further including a training module to: prompt the user for a scripted neutral request; identify a second emotional feature of the scripted neutral request; update the baseline feature of the vocal pattern database based on the second emotional feature; prompt the user for a scripted emotional request; identify a third emotional feature of the scripted emotional request; and update the vocal pattern database based on the third emotional feature.

Example 20 includes the subject matter of any of Examples 1-19, and further including a training module to: receive a plurality of pre-recorded requests; identify a plurality of sample emotional features of the pre-recorded requests; and update the vocal pattern database based on the identified sample emotional features.

Example 21 includes a method for handling spoken requests by a computing device, the method comprising receiving, by the computing device, a user request, the user request representing a natural language request spoken by a user of the computing device; identifying, by the computing device, an emotional feature of the user request, the emotional feature comprising a vocal pattern characteristic of the user request associated with one or more human emotions; comparing, by the computing device, the identified emotional feature to a baseline feature of a vocal pattern database; estimating, by the computing device, an emotional state of the user request based on comparing the identified emotional feature to the baseline feature; and modulating, by the computing device, a natural language response to the user request as a function of the emotional state and the vocal pattern database.

Example 22 includes the subject matter of Example 21, and wherein identifying the emotional feature comprises identifying a pitch, an amplitude, a rate of speech, a disfluency rate, a variability of the rate of speech, a tonality at an end of the user request, a stressed syllable, a stressed phoneme, or a message length.

Example 23 includes the subject matter of any of Examples 21 and 22, and wherein identifying the emotional feature comprises: performing speech recognition to determine a textual representation of the user request; and identifying and scoring a word choice of the user request based on the textual representation.

Example 24 includes the subject matter of any of Examples 21-23, and further including updating, by the computing device, the vocal pattern database based on the identified emotional feature.

Example 25 includes the subject matter of any of Examples 21-24, and wherein estimating the emotional state comprises estimating at least one of: an urgency level of the user request; a certainty level of the user request; or a dominance level of the user request.

Example 26 includes the subject matter of any of Examples 21-25, and wherein modulating the natural language response comprises modulating a pitch, an amplitude, a rate of speech, a disfluency rate, a variability of the rate of speech, a stress of a syllable, a stress of a phoneme, or a message length of the natural language response, or a tonality at an end of the natural language response.

Example 27 includes the subject matter of any of Examples 21-26, and wherein modulating the natural language response comprises modifying a word choice of the natural language response as a function of the emotional state and the vocal pattern database.

Example 28 includes the subject matter of any of Examples 21-27, and wherein modulating the natural language response comprises modulating the natural language response to mimic the emotional state of the user request as a function of the emotional state and the vocal pattern database.

Example 29 includes the subject matter of any of Examples 21-28, and wherein estimating the emotional state comprises estimating an urgency level of the user request, wherein the estimated urgency level has a predetermined relationship to a baseline urgency level; and modulating the response comprises modulating the natural language response to mimic the estimated urgency level of the user request.

Example 30 includes the subject matter of any of Examples 21-29, and wherein modulating the natural language response comprises modulating the natural language response to exhibit an emotional state opposite the estimated emotional state of the user request.

Example 31 includes the subject matter of any of Examples 21-30, and wherein estimating the emotional state comprises estimating a dominance level of the user request, wherein the estimated dominance level has a predetermined relationship to a baseline dominance level; and modulating the response comprises modulating the natural language response to exhibit a dominance level opposite the estimated dominance level of the user request.

Example 32 includes the subject matter of any of Examples 21-31, and wherein modulating the natural language response comprises modulating the natural language response to convey information using a simulated emotional state.

Example 33 includes the subject matter of any of Examples 21-32, and wherein modulating the natural language response to convey the information comprises modulating the natural language response to convey an uncertainty level of the natural language response using the simulated emotional state.

Example 34 includes the subject matter of any of Examples 21-33, and further including determining, by the computing device, the natural language response as a function of the emotional state of the user request.

Example 35 includes the subject matter of any of Examples 21-34, and wherein estimating the emotional state comprises estimating a certainty level of the user request, wherein the estimated certainty level has a predetermined relationship to a baseline certainty level; and determining the natural language response comprises generating a clarifying question.

Example 36 includes the subject matter of any of Examples 21-35, and wherein estimating the emotional state comprises estimating a certainty level of the user request, wherein the estimated certainty level has a predetermined relationship to a baseline certainty level; and determining the natural language response comprises paraphrasing the user request.

Example 37 includes the subject matter of any of Examples 21-36, and wherein estimating the emotional state comprises estimating an urgency level of the user request, wherein the estimated urgency level has a predetermined relationship to a baseline urgency level; and determining the natural language response comprises generating a request whether to defer performance of the user request.

Example 38 includes the subject matter of any of Examples 21-37, and wherein determining the natural language response comprises determining no natural language response is necessary; and modulating the natural language response comprises suppressing the natural language response.

Example 39 includes the subject matter of any of Examples 21-38, and further including prompting, by the computing device, the user for a scripted neutral request; identifying, by the computing device, a second emotional feature of the scripted neutral request; updating, by the computing device, the baseline feature of the vocal pattern database based on the second emotional feature; prompting, by the computing device, the user for a scripted emotional request; identifying, by the computing device, a third emotional feature of the scripted emotional request; and updating, by the computing device, the vocal pattern database based on the third emotional feature.

Example 40 includes the subject matter of any of Examples 21-39, and further including receiving, by the computing device, a plurality of pre-recorded requests; identifying, by the computing device, a plurality of sample emotional features of the pre-recorded requests; and updating, by the computing device, the vocal pattern database based on the identified sample emotional features.

Example 41 includes a computing device comprising a processor; and a memory having stored therein a plurality of instructions that when executed by the processor cause the computing device to perform the method of any of Examples 21-40.

Example 42 includes a one or more machine readable storage media comprising a plurality of instructions stored thereon that in response to being executed result in a computing device performing the method of any of Examples 21-40.

Example 43 includes a computing device comprising means for performing the method of any of Examples 21-40.

The invention claimed is:

1. A computing device for handling spoken requests, the computing device comprising:
   an audio sensor;
   a training module to:
      prompt a user of the computing device for a plurality of neutral scripted requests;
      capture a first audio signal from the audio sensor comprising the plurality of neutral scripted requests by converting audio from the user from analog to digital format;
      prompt the user for a plurality of emotional scripted requests;
      capture a second audio signal from the audio sensor comprising the plurality of emotional scripted requests by converting audio from the user from analog to digital format;
      identify emotional features of each of the plurality of neutral scripted requests and each of the plurality of emotional scripted requests; and
      update a baseline emotional feature of a vocal pattern database based on the plurality of neutral scripted requests and the plurality of emotional scripted requests and the identified emotional features of each of the plurality of neutral scripted requests and the plurality of emotional scripted requests;
   a request analysis module to:
      receive a user request, the user request to represent a natural language request spoken by the user of the computing device;
      determine one or more audio features of the user request, wherein the one or more audio features comprises at least one of frequency, amplitude, or timbre; and
      identify an emotional feature of the user request, the emotional feature comprising a vocal pattern characteristic of the user request associated with one or more human emotions and the one or more audio features of the user request;
   an emotion recognition module to:
      compare the identified emotional feature to the baseline emotional feature of the vocal pattern database; and
      estimate an emotional state of the user request based on the comparison of the identified emotional feature to the baseline feature; and
   an output module to modulate a natural language response to the user request as a function of the emotional state and the vocal pattern database.

2. The computing device of claim 1, wherein to modulate the natural language response comprises to modulate the natural language response to mimic the emotional state of the user request as a function of the emotional state and the vocal pattern database.

3. The computing device of claim 2, wherein:
   the estimated emotional state comprises an estimated urgency level of the user request, wherein the estimated urgency level has a predetermined relationship to a baseline urgency level; and
   to modulate the response comprises to modulate the natural language response to mimic the estimated urgency level of the user request.

4. The computing device of claim 1, wherein to modulate the natural language response comprises to modulate the natural language response to exhibit an emotional state opposite the estimated emotional state of the user request.

5. The computing device of claim 4, wherein:
   the estimated emotional state comprises an estimated dominance level of the user request, wherein the estimated dominance level has a predetermined relationship to a baseline dominance level; and
   to modulate the response comprises to modulate the natural language response to exhibit a dominance level opposite the estimated dominance level of the user request.

6. The computing device of claim 1, wherein to modulate the natural language response comprises to modulate the natural language response to convey information using a simulated emotional state.

7. The computing device of claim 6, wherein to modulate the natural language response to convey the information comprises to modulate the natural language response to convey an uncertainty level of the natural language response using the simulated emotional state.

8. The computing device of claim 1, further comprising a response generation module to determine the natural language response as a function of the emotional state of the user request.

9. The computing device of claim 8, wherein:
   the estimated emotional state comprises an estimated certainty level of the user request, wherein the estimated certainty level has a predetermined relationship to a baseline certainty level; and
   to determine the natural language response comprises to generate a clarifying question.

10. The computing device of claim 8, wherein:
    the estimated emotional state comprises an estimated urgency level of the user request, wherein the estimated urgency level has a predetermined relationship to a baseline urgency level; and
    to determine the natural language response comprises to generate a request whether to defer performance of the user request.

11. A method for handling spoken requests by a computing device, the method comprising:
    prompting, by the computing device, a user of the computing device for a plurality of neutral scripted requests;
    capturing, by an audio sensor of the computing device, a first audio signal comprising the plurality of neutral scripted requests by converting audio from the user from analog to digital format;
    prompting, by the computing device, the user for a plurality of emotional scripted requests;
    capturing, by the audio sensor, a second audio signal comprising the plurality of emotional scripted requests by converting audio from the user from analog to digital format;
    identifying, by the computing device, emotional features of each of the plurality of neutral scripted requests and each of the plurality of emotional scripted requests;
    updating a baseline emotional feature of a vocal pattern database based on the plurality of neutral scripted requests and the plurality of emotional scripted requests and the identified emotional features of each of the plurality of neutral scripted requests and the plurality of emotional scripted requests;

receiving, by the computing device, a user request, the user request representing a natural language request spoken by the user of the computing device;

determining one or more audio features of the user request, wherein the one of more audio features comprises at least one of frequency, amplitude, or timbre;

identifying, by the computing device, an emotional feature of the user request, the emotional feature comprising a vocal pattern characteristic of the user request associated with one or more human emotions and the one or more audio features of the user request;

comparing, by the computing device, the identified emotional feature to a baseline feature of a vocal pattern database;

estimating, by the computing device, an emotional state of the user request based on comparing the identified emotional feature to the baseline feature; and modulating, by the computing device, a natural language response to the user request as a function of the emotional state and the vocal pattern database.

12. The method of claim 11, wherein modulating the natural language response comprises modulating the natural language response to mimic the emotional state of the user request as a function of the emotional state and the vocal pattern database.

13. The method of claim 11, wherein modulating the natural language response comprises modulating the natural language response to exhibit an emotional state opposite the estimated emotional state of the user request.

14. The method of claim 11, wherein modulating the natural language response comprises modulating the natural language response to convey information using a simulated emotional state.

15. One or more non-transitory computer-readable storage media comprising a plurality of instructions that in response to being executed cause a computing device to:

prompt a user of the computing device for a plurality of neutral scripted requests;

capture a first audio signal from an audio sensor of the computing device comprising the plurality of neutral scripted requests by converting audio from the user from analog to digital format;

prompt the user for a plurality of emotional scripted requests;

capture a second audio signal from the audio sensor comprising the plurality of emotional scripted requests by converting audio from the user from analog to digital format;

identify emotional features of each of the plurality of neutral scripted requests and each of the plurality of emotional scripted requests; and update a baseline emotional feature of a vocal pattern database based on the plurality of neutral scripted requests and the plurality of emotional scripted requests and the identified emotional features of each of the plurality of neutral scripted requests and the plurality of emotional scripted requests;

receive a user request, the user request representing a natural language request spoken by the user of the computing device;

determine one or more audio features of the user request, wherein the one or more audio features comprises at least one of frequency, amplitude, or timbre;

identify an emotional feature of the user request, the emotional feature comprising a vocal pattern characteristic of the user request associated with one or more human emotions and the one or more audio features of the user request;

compare the identified emotional feature to the baseline feature of the vocal pattern database;

estimate an emotional state of the user request based on comparing the identified emotional feature to the baseline feature; and modulate a natural language response to the user request as a function of the emotional state and the vocal pattern database.

16. The one or more non-transitory computer-readable storage media of claim 15, wherein to modulate the natural language response comprises to modulate the natural language response to mimic the emotional state of the user request as a function of the emotional state and the vocal pattern database.

17. The one or more non-transitory computer-readable storage media of claim 15, wherein to modulate the natural language response comprises to modulate the natural language response to exhibit an emotional state opposite the estimated emotional state of the user request.

18. The one or more non-transitory computer-readable storage media of claim 15, wherein to modulate the natural language response comprises to modulate the natural language response to convey information using a simulated emotional state.

19. The one or more non-transitory computer-readable storage media of claim 15, further comprising a plurality of instructions that in response to being executed cause the computing device to determine the natural language response as a function of the emotional state of the user request.

* * * * *